UNITED STATES PATENT OFFICE.

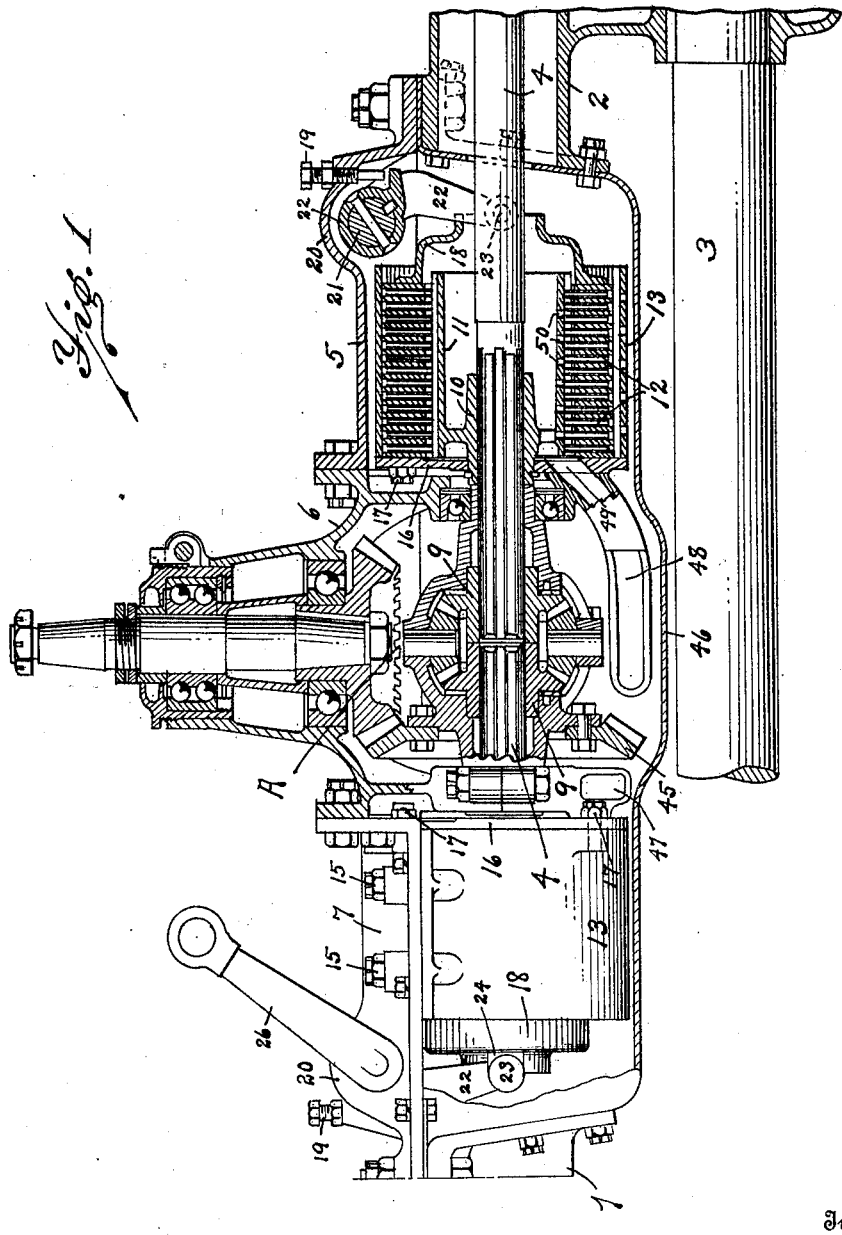

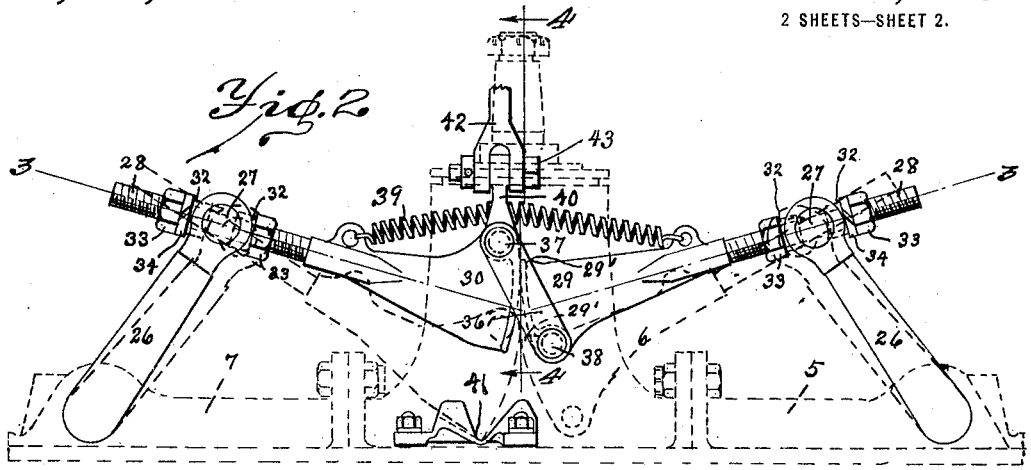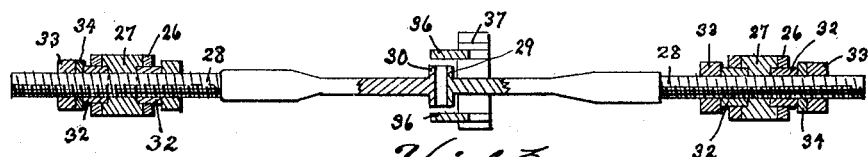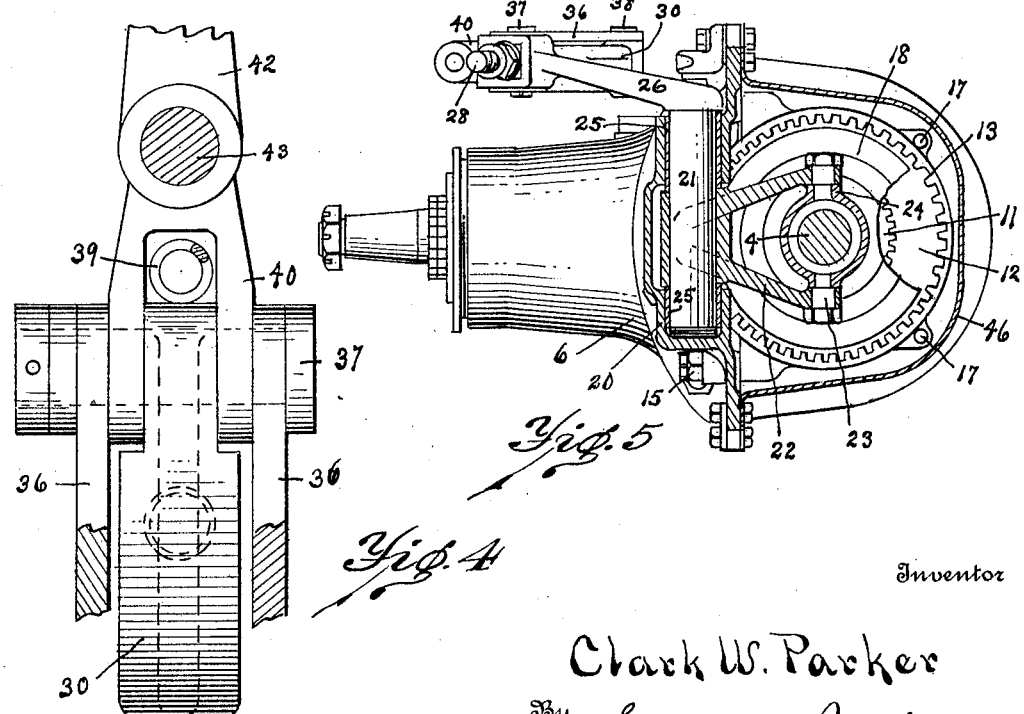

CLARK W. PARKER, OF NEW YORK, N. Y.

BRAKE MECHANISM.

1,393,390. Specification of Letters Patent. Patented Oct. 11, 1921.

Application filed December 13, 1920. Serial No. 430,204.

*To all whom it may concern:*

Be it known that I, CLARK W. PARKER, a citizen of the United States, and residing at New York, in the county of New York and State of New York, have invented a new and Improved Brake Mechanism, of which the following is a specification.

This invention relates to axle structure of the general type shown in my prior Patent No. 1,315,236, dated September 9, 1919, and has for its object an improvement in the structure of the brake operating mechanism, resulting in a uniform application of power to the brake mechanism through the entire active range of the operating mechanism. A further object of this invention is to provide a toggle device so arranged as to avoid the danger of drawing its arms beyond a position of alinement and thus reversing their action.

In my prior patent the brake mechanism is secured to the cover of the axle casing and the shafts which support the levers which operate the brakes are mounted in this casing, which is often inconvenient. In the present construction the shafts and the operating levers for the brakes are mounted on the same plate which supports the brake mechanisms.

This invention therefore consists in the details of construction illustrated in the accompanying drawings and particularly pointed out in the claims.

In the drawings, Figure 1 is a horizontal section of differential and brake mechanism and the supports therefor. Fig. 2 is a plan of the toggle mechanism for operating the brakes. Fig. 3 is a section on the line 3—3 of Fig. 2. Fig. 4 is a detail of the toggle mechanism taken on the line 4—4 of Fig. 2. Fig. 5 is a transverse section of the supporting plate for the brake levers.

Similar reference characters refer to like parts throughout the several views.

Fig. 1 shows the inner ends of the two frame members or brackets 1 and 2 which are mounted on the axle 3 and support the bearings for the outer ends of the two part shaft 4. These brackets or frame members are connected by a heavy plate made up of the three parts 5, 6 and 7, when the structure is very heavy, the central part 6 supporting the differential gearing A, which embodies the bevel gears 9 which are internally fluted to slidably engage the inner ends of the part shafts 4.

On each of these part shafts is the hub 10 of the longitudinally toothed drum 11 on which are mounted the brake disks 12, one half of which have internal teeth meshing with those of the drum 11 and the remainder being provided with external teeth to engage the longitudinal internal teeth of the shell 13. These shells are secured to the parts 5 and 7 of the front plate by means of screws 15. An end plate 16 is attached to the inner end of each shell 13 by means of screws 17 and these plates receive those thrusts of the brake disks 12 which they receive from the collars 18.

The plates 5 and 7 are formed with bosses 20 in which the upright brake shafts 21 are mounted. On these brake shafts and between their ends are mounted the arms 22 which carry pins 23 in their free ends fitting in sockets 24 in the hubs of the collars 18 as shown in Fig. 5. Bushings 25 may be provided if desired. Crank arms 26 extend from the upper ends of these brake shafts 21 and when the outer ends of these arms 26 are forced apart, the friction between the brake disks 12 caused by the pressure exerted by the arms 22 and disks 18 serves to stop the shafts 4 from rotating. The outward movement of the arms 22 is limited by the stop screws 19.

The mechanism for swinging the arms 26 is shown in Figs. 2, 3, 4 and 5. The arms 26 are forked at their outer ends and drilled to receive the short cylinders 27 which are drilled transversely to receive the shanks 28 of the toggle cams 29 and 30. These cylindrical blocks are flattened to constitute seats for the collars 32 which are engaged by the nuts 33, spring washers 34 being used if desired. When these nuts are screwed down, the shanks 28, the collars, nuts and cylinders 27 act as units.

A toggle mechanism is positioned between the outer ends of arms 26 and arranged to force them apart when the toggle arms 29 and 30 are moved in a direction tending to bring them into alinement. It will be noted that the adjacent ends are arcuately formed and in shape are approximate parts of cylinders whose centers are on that side of center lines of the toggle arms toward the shaft 4.

The arcuately finished ends of the toggle arms 29 and 30 are held in contact with each other by means of the spring 39 and arranged to be moved in rolling engagement in a direction tending toward alinement by means of the links 36 and pins 37 and 38. Suitable operating connections are provided by a clevis 40 forming an attachment for the pull rod 42.

It will be seen that when the toggle arms are moved from the position indicated by the dotted lines in Fig. 2 to the position shown by the full lines, that the spreading action imparted to the arms 26 will be rapid and of that varying leverage which is common to all pivoted toggles because the arm 29 is in contact with the face of arm 30 throughout this range of the movement at the point 29′ and not upon the cylindrical surface. From the point where the arms are shown by full lines at which the cylindrical surfaces begin to make rolling contact and through the remainder of their range of action the leverage will be not only greater but uniform and remaining constant, even though, because of excessive wear on the brake parts, it should be necessary to draw the arms forward beyond a position of alinement.

The value of this rolling cam construction of the toggle mechanism must be readily apparent when compared with the simple, pivoted toggle illustrated in my previous patent. As the arms were drawn toward alinement the pivoted toggle delivers a consistently varying leverage, resulting in uncertain brake action with the danger of reversing its action and completely releasing the brake should the arms be drawn past alinement.

The rotation of the gear 45 carries up the lubricating oil which is held in the shell 46 sufficiently to let it fall into the oil passages 47 and 48 which conduct it to the openings 49 in the plates 16, through which the lubricant passes into the drums 11. These are provided with any desired number of holes 50 through which the oil flows to the brake disks, not only lubricating but also cooling them.

The details and proportions of the various parts of this brake mechanism and the operating devices therefor may all be changed by those skilled in the art without departing from the spirit of my invention as set forth in the following claims.

I claim:—

1. The combination of a two-part shaft and a differential gearing connecting them, a disk-brake mechanism on each part shaft, a supporting plate on which the brake mechanisms and the differential mechanism are mounted, and operating means carried by each end of said plate to actuate said brake mechanism.

2. The combination of a two-part shaft and a differential gearing connecting them, a disk-brake mechanism on each part shaft, a supporting plate on which the brake mechanisms and the differential mechanism are mounted, and operating means carried by each end of said plate to actuate said brake mechanism, said supporting plate being in three parts each removable together with the mechanism mounted thereon independently of the other parts.

3. The combination of a two-part shaft and a differential gearing connecting them, a disk-brake mechanism on each part shaft, a supporting plate on which the brake mechanisms and the differential mechanism are mounted, and operating means carried by each end of said plate to actuate said brake mechanism comprising an upright shaft, an arm on the shaft engaging the brake mechanism, a second arm on an end of the shaft and toggle mechanism connecting said second arms.

4. The combination of a pair of alined part-shafts and means for rotating them, a casing for the shaft having a cover plate, a disk-brake mechanism for each part-shaft mounted on the cover plate and comprising a movable collar, a shaft journaled in the cover plate, an arm on the shaft engaging the collar and an arm on the shaft outside of the casing, a pair of engaging toggle members connecting to said arms and having rolling-contact cam faces, means for holding said faces together, and means for actuating said toggle members.

5. The combination of a pair of alined shafts and means for rotating them, a casing therefor having a cover plate, a disk-brake for each shaft mounted on the cover plate and comprising a short shaft journaled in the cover plate and an arm attached to said short shaft outside the casing, a toggle member for said arms embodying shanks adjustable endwise in the ends of the arms and having cam surfaces at their adjacent ends, pins mounted in said adjacent ends, links connecting said pins, a spring normally holding said cam faces together and the brakes inoperative, and means to swing the toggle members to cause the brakes to operate.

6. In a vehicle, a two-part driving shaft and a differential between the adjacent ends thereof, a brake on each part shaft and a toggle mechanism to operate said brakes comprising short shafts transverse to the two-part shaft, arms at the ends of the transverse shaft, toggle members adjustably mounted in said arms and having arcuate ends, a spring to hold the arcuate ends in engagement, a link pivoted to each arcuate end, and means to swing said toggle members.

7. The combination of a two-part shaft and a differential gearing connecting them, a disk-brake mechanism on each part shaft, and means adjacent the outer ends of said disk-brake mechanisms to press the disks of said brake mechanisms toward the differential gearing to cause brake action.

8. The combination of a two-part shaft and a differential gearing connecting them, a disk-brake mechanism on each part shaft, a support for the brake mechanisms, and toggle mechanism adjacent the outer ends of the brake mechanism to press the disks of the brake mechanism toward the differential gearing to cause brake action.

9. The combination of a two-part shaft and a differential gearing connecting them, a disk-brake mechanism on each part shaft, a support for the brake mechanisms, toggle mechanism adjacent the ends of the brake mechanism to actuate the brake mechanism, said toggle mechanism embodying a pair of pivoted engaging members with cam surfaces having rolling engagement, and means for simultaneously rotating said members, the profile of said cams adapted to continuously vary the distance between the pivots of said members when said members are rotated.

10. The combination of a two-part shaft and a differential gearing connecting them, a disk-brake mechanism on each part shaft, a supporting plate on which the brake mechanisms and the differential mechanism are mounted, and operating means carried by each end of said plate to actuate said brake mechanism comprising an upright shaft, an arm on the shaft engaging the brake mechanism, a second arm on an end of the shaft and toggle mechanism connecting said second arms, said toggle mechanism embodying two cams disposed between and pivotally connected to the second arms, the cam surfaces of said cams having rolling engagement, and means for rotating said cams, the profile of the said cams adapted to continuously vary the distance between the ends of the said second arms when said cams are rotated.

11. In a vehicle, a two-part driving shaft and a differential between the adjacent ends thereof, a brake on each part shaft and a toggle mechanism to operate said brakes comprising short shafts transverse to the two-part shaft, arms at the ends of the transverse shaft, toggle members adjustably mounted in said arms and having arcuate ends, a spring to hold the arcuate ends in engagement, a link pivoted to each arcuate end, and means to swing said toggle members, the profile of the said arcuate ends being adapted to continuously increase the distance between the ends of said arms when said toggle members are swung to operate the brakes.

12. The combination of a two-part shaft and differential gearing connecting them, a disk-brake mechanism on each part shaft, a support for the brake mechanisms, toggle mechanism adjacent the ends of the brake mechanism to actuate the brake mechanism, said toggle mechanism embodying a pair of pivoted engaging members with cam surfaces having rolling engagement, and means for simultaneously rotating said members, the profile of said cams being adapted, when said cams are rotated, to vary the distance between the ends of the said arms with different ratios of leverage and operating during the latter part of their range of action with a uniform ratio of leverage.

13. In a vehicle, a two-part driving shaft and a differential between the adjacent ends thereof, a brake on each part shaft and a toggle mechanism to operate said brakes comprising short shafts transverse to the two-part shaft, arms at the ends of the transverse shaft, toggle members adjustably mounted in said arms and having arcuate ends, a spring to hold the arcuate ends in engagement, a link pivoted to each arcuate end, and means to swing said toggle members, the profile of said cams being adapted, when said cams are rotated, to vary the distance between the ends of the said arms with different ratios of leverage and operating during the latter part of their range of action with a uniform ratio of leverage.

14. In a brake operating device, in combination, opposed brake members, opposed operating arms attached thereto, a toggle mechanism connecting ends of said opposed arms embodying a pair of pivoted engaging members with arcuate ends having rolling engagement, means for simultaneously rotating said members, the profile of said cams being adapted, when said cams are rotated, to vary the distance between the ends of the said arms with different ratios of leverage and operating during the latter part of their range of action with a uniform ratio of leverage.

15. In a brake operating device, in combination, opposed brake members, toggle mechanism connecting said opposed members embodying a pair of pivoted engaging members with arcuate ends having rolling engagement, means for simultaneously rotating said members, the profile of said cams being adapted, when said cams are rotated, to vary the distance between the ends of the said arms with different ratios of leverage and operating during the latter part of their range of action with a uniform ratio of leverage.

16. The combination of a two-part shaft and a differential gearing connecting them, a disk-brake mechanism on each part shaft, a support for the brake mechanisms and the differential mechanism, and toggle mechanism mounted on the same support as the brake mechanism engaging said brake mechanism to operate the same.

CLARK W. PARKER.